April 13, 1965    A. P. ANDERSON ETAL    3,178,224
SEAT BELT POSITIONERS
Filed Jan. 2, 1963
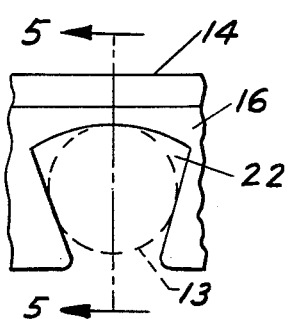
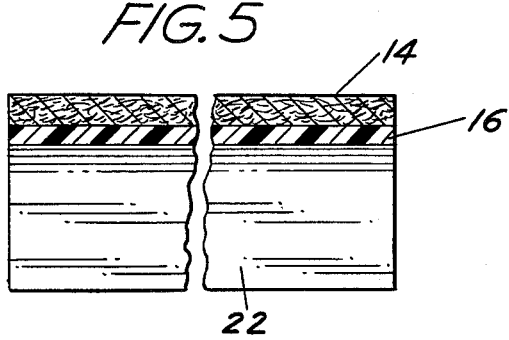
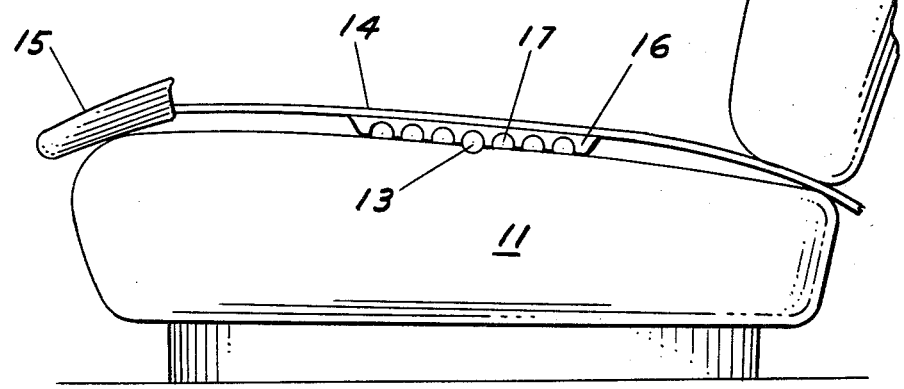
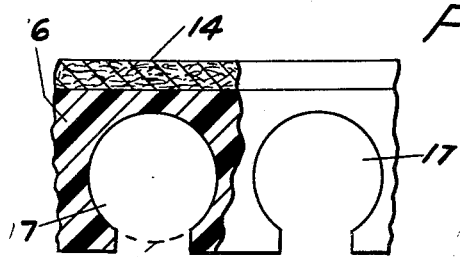
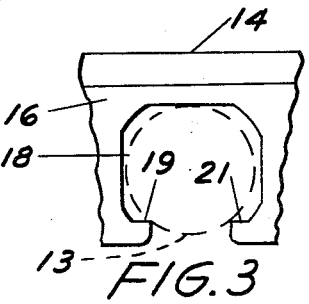
ALAN P. ANDERSON
JESSE W. RICHARDS
              INVENTORS
BY John R. Faulkner
Olin B. Johnson
              ATTORNEYS

United States Patent Office 3,178,224
Patented Apr. 13, 1965

3,178,224
SEAT BELT POSITIONERS
Alan P. Anderson, Detroit, and Jesse W. Richards, Dearborn, Mich., assignors to Ford Motor Company, Dearborn, Mich., a corporation of Delaware
Filed Jan. 2, 1963, Ser. No. 248,929
2 Claims. (Cl. 297—385)

This invention relates to a flexible device for positioning the free end of a belt or strap when the latter is not in use.

In particular, this invention relates to seat belts or seat harnesses in passenger carrying vehicles and to a belt positioning device for releasably engaging the surface of a seat with which such belt is associated or a suitable nearby object.

In the preferred embodiment, this invention relates to a flexible positioning device secured to a seat belt and constructed and arranged to clamp over complementarily shaped welting upon the surface of a seat with which the belt is used so as to firmly secure the free portion of the belt to the surface of the seat until forcibly displaced from such welting.

Many types of safety belts and harnesses have been proposed for land, water, and air vehicles for restraining a seated occupant from being thrown from his seat as a result of a sudden movement or cessation of movement of this vehicle. Most generally, the safety belt or seat belt comprises two separate belt sections or straps. Each such section is secured to a mounting or anchoring device, which usually passes through the vehicle body floor and is often secured to the vehicle chassis frame. When in use the opposite ends of the belt sections are passed forwardly, as for instance between the seat proper and the back rest, around the seat occupant and are detachably and adjustably secured together by a buckle or other suitable engaging means. When not in use, the loose ends are free to move about the seat, to escape between the seat and the back rest, and to fall into or through an open doorway, as when passengers enter or leave the vehicle.

It is an object of this invention, therefore, to provide convenient, inexpensive means for positioning seat belts when not in use and thus to avoid the untidy appearance and nuisance of loose seat belts.

Another object of this invention is to provide positioning means which can be fixedly attached to a seat belt and constructed and arranged to be detachably secured to a complementarily shaped portion of the seat surface so as to require a definite though moderate force to effect displacement.

Still another object of this invention is to provide positioning means for securing a seat belt when not in use that is constructed and arranged for attachment to the passenger contacting side of the belt and having sufficient softness and flexibility to prevent any discomfiture to the passenger when in use.

Other features and objects of this invention will appear in the following description and appended claims, reference being had to the accompanying drawing forming a part of this specification wherein like reference characters designate corresponding parts in the several views.

FIGURE 1 is a partial side view in elevation of a motor vehicle seat and associated seat belt with a seat belt positioning device embodying the principles of this invention incorporated therewith;

FIGURE 2 is a side view, partially in section, of a portion of the positioning device and seat belt shown in FIGURE 1 and drawn to a larger scale;

FIGURE 3 is a side view of a different embodiment of the positioning device with attached seat belt shown in the previous figures;

FIGURE 4 is a side view of a portion of still another embodiment of the positioning device of this invention again shown in attachment with a portion of a seat belt, and;

FIGURE 5 is a cross-sectional view of the positioning device taken along the line 5—5 of FIGURE 4.

Referring now to the drawing, the numerals 11 and 12 indicate the seat proper and the back rest, respectively, of the front seat of an automobile. One section of a seat belt 14 having a buckle 15 located at its free end is shown extended forwardly across seat 11. Belt 14 is shown passing between seat 11 and back rest 12. Since the anchor end of the belt is not directly concerned with this invention it does not appear in the drawing but it will be understood that belt 14 continues to a conventional mounting device or anchoring device positioned behind the seat. Seat 11 has on its upper surface a transverse strip or welt 13.

Positioned on the underside of belt 14 there is shown one embodiment of the positioning device of this invention, a clamp-over pad 16. Pad 16 is ordinarily a plastic, i.e. a suitable organic polymeric material generally classified as thermoplastic and fixedly attached to belt 14 by conventional retaining means, e.g. clamping, sewing, adhesives, etc. However, it is within the scope of this invention to employ a pad in the form of a slip-over sleeve which may be fixedly or slidably mounted on belt 14. Pad 16 is detachably engaged with welt or welting 13 which here represents the existing trim welting transversely arranged on the top of the cushion as in many conventional seat coverings. However, it will be understood that welt 13 can be specifically designed to cooperate with a clamp-over pad attached to the belt. This permits considerable latitude in welt design, the primary considerations being comfort of the passenger, attractiveness of design, and adaptability for attachment to a clamp-over pad of the type herein described. Pad 16 is positioned on the underside, i.e. the passenger contacting side when the seat belt is in use, and hence is formed of a material and constructed and arranged so as not to interfere with the comfort of the passenger in normal use. As noted above, pad 16 is formed of a suitable resilient or elastic material such as polyethylene, polypropylene, rubber, or other similar materials. Pad 16 extends below the under surface of the belt and has positioned along its underside, i.e. opposite belt 14, a plurality of transverse welt engaging substantially C-shaped slots or recesses 17 constructed and arranged to yieldably distort and clamp over the mating member, welt 13, and thereby firmly but detachably locate the belt on the cushion. Engagement is effected by merely placing pad 16 and belt 14 over welt 13 and pressing downward, and if necessary either slightly forward or backward, until welt 13 slips into and is secured by the walls of one of the recesses 17. The welt engaging recesses are preferably positioned as close together as the structural characteristics of the material will permit without reducing the clamping efficiency of the recess. In one preferred embodiment the openings into adjacent recesses is in the range of about 0.75 to 1.5 times the maximum width of the welt received.

Pad 16 and welt 13 should be designed so that a slight pressure, preferably about 3 pounds, is required to overcome the clamping action when picking up the belt end. Welt 13 is ordinarily formed of a resilient vinyl plastic, polyethylene, or similar firmly yieldable material. In the embodiment shown in FIGURES 1 and 2 the recesses 17 are designed to receive and retain a substantially cylindrical welt. Their internal surfaces describe an angle of about 270° between the fore and aft extremities of the opening through which the welt 13 enters. In FIGURE 1 the welt 13 is shown in its full home position. Welt 13 may be held in place either by designing recess 17 to be slightly smaller than welt 13 when undistorted so that its elastic properties will provide the requisite holding force when a welt is positioned inside, or each recess may be equipped with suitable retention means as, for example, lips or flanges positioned adjacent the opening. The latter is exemplified by the embodiment shown in FIGURE 3 wherein recess 18 is equipped with lips or flanges 19 and 21 which yieldably admit a welt, here shown in broken outline, and close behind its head and about its base thereby forming yieldable retention means holding the welt in place until a displacement pressure is exerted.

In FIGURE 4 a further embodiment of pad 16 is shown with essentially planar sides which flare outward as they extend upwardly from the mouth on entrance into recess 22. In FIGURE 5 there is shown a view of the belt and pad of FIGURE 4 partly in section and directed at an angle of 90° away from the view shown in FIGURE 4.

Although the invention has been described in its preferred form with a certain degree of particularity, it is understood that the present invention disclosure of the preferred form has been made only by way of example, and that numerous changes in the details of construction and the combination and arrangement of parts may be resorted to without departing from the spirit and the scope of the invention as hereinafter claimed.

We claim:

1. In a motor vehicle having a seat cushion provided with at least one ornamental welt intermediate the front and rear edges thereof,
    said welt extending in a direction generally parallel to said cushion edges,
    an elongated seat belt section adapted when not in passenger restraining use to rest on the surface of said cushion and to pass over said welt,
    and flexible seat belt positioning means on said belt section,
    said positioning means comprising a soft organic polymeric material having at least one recess therein extending transversely of the longitudinal axis of said belt section,
    said recess grippably receiving said welt and coacting with the latter to releasably hold said belt section against displacement from the surface of said seat cushion.

2. In a motor vehicle having a seat cushion provided with at least one ornamental welt intermediate the front and rear edges thereof,
    said welt extending in a direction generally parallel to said cushion front and rear edges,
    an elongated seat belt section adapted when not in passenger restraining use to rest on the surface of said cushion and extending from the rear edge toward the front edge thereof,
    and seat belt positioning means on said belt section positioned to overlie said welt when said seat belt is at rest on said cushion,
    said positioning means comprising a flexible member having a plurality of C-shaped recesses therein each extending transversely of the longitudinal axis of said belt section,
    any one of said recesses grippably receiving said welt and coacting with the latter to releasably hold said belt section against displacement from the surface of said seat cushion.

References Cited by the Examiner
UNITED STATES PATENTS

| 2,848,250 | 8/58 | Sheren | 297—385 |
| 3,096,122 | 7/63 | Connell | 297—385 |

FOREIGN PATENTS

| 49,722 | 7/40 | Netherlands. |
| 515,224 | 2/55 | Italy. |

FRANK B. SHERRY, *Primary Examiner.*